United States Patent [19]
Cherry

[11] 3,849,983
[45] Nov. 26, 1974

[54] PROPELLANT LINER FOR ACTIVE COOLING

[75] Inventor: Charles C. Cherry, McGregor, Tex.

[73] Assignee: Rockwell International Corporation, El Segundo, Calif.

[22] Filed: Nov. 20, 1972

[21] Appl. No.: 308,189

[52] U.S. Cl................ 60/255, 60/39.47, 60/267, 102/103
[51] Int. Cl.............................................. F02k 9/04
[58] Field of Search........ 60/253, 255, 267, DIG. 8, 60/39.47; 102/103

[56] References Cited
UNITED STATES PATENTS

| | | | |
|---|---|---|---|
| 2,522,113 | 9/1950 | Goddard | 60/255 |
| 3,069,850 | 12/1962 | Ledwith et al. | 60/253 X |
| 3,162,012 | 12/1964 | Blaze et al. | 60/267 |
| 3,220,180 | 11/1965 | Heckert | 60/267 |
| 3,267,664 | 8/1966 | Jones et al. | 60/267 X |
| 3,440,820 | 4/1969 | Caveny | 60/253 |
| 3,449,189 | 6/1969 | Hatch | 60/267 X |

Primary Examiner—Carlton R. Croyle
Assistant Examiner—Robert E. Garrett
Attorney, Agent, or Firm—L. Lee Humphries; Robert G. Upton

[57] ABSTRACT

This invention is directed to a device for actively cooling the propellant grain of a missile during captive or free flight when aerodynamic heating conditions are present. The device consists of a helically arranged coolant coil embedded in a liner that separates the missile propellant from the missile case.

5 Claims, 3 Drawing Figures

PROPELLANT LINER FOR ACTIVE COOLING

BACKGROUND OF THE INVENTION

1. Field of the Invention

Solid rocket missiles of the type carried by aircraft are subjected to excessive aerodynamic heating during high mach number environments prior to launching. Heretofore, these solid propellant missiles are insulated from the aeroheat conditions by thick layers of insulation material. These layers, however, are of sufficient weight to either reduce the size of the payload or the range of the missile. Attempts to provide adequate cooling to protect these solid propellant grains within the missile have heretofore been inefficient.

2. Description of the Prior Art

Various methods have been devised heretofore to either insulate the solid propellant grains of missiles or to provide a means to heat the outer layers of solid propellant or liquid propellant missiles. One method is described in U.S. Pat. No. 3,440,820, in which a thermal protection system is based on an annular space formed between the inner shell of the solid propellant missile and an outer concentric shell of the missile. The volume or space defined by the inner and outer shells is evacuated which reduces to a minimum free convection heat transfer between the two surfaces of the motor case and the outer shield, the mirrored surface is reduced to irradiate heat transfer between surfaces, thus the missile components are protected from excessive periods of aerodynamics heating.

This system suffers from an inherent weakness in that it is heavy and involves complicated fabrication methods which include forming additional shells to form the annular space for the heat barrier. Additionally, a complex valving system is required to control the evacuation or filling procedure to maintain the annular chamber within acceptable limits during operation of the missile.

Another patent, to Rannenberg et al (U.S. Pat. No. 3,180,111) utilizes a series of loosely connected wick material pads surrounding a body to be cooled. This system provides a flexible blanket formed by a plurality of interconnected cells, each cell containing a wick material in a chamber. The wicks hold the material which, when wetted, provides the cooling means for the substance which it surrounds. This system suffers in that it is complicated and heavy; a condition that takes away from overall missile performance. Heat pipes are necessary to provide each of the multiplicity of discs that contain the wick material, the interconnecting liquid refrigerant supply system being highly complicated in that each disc of wick material must be individually supplied by the piping system.

SUMMARY OF THE INVENTION

It is an object of this invention to provide a means to cool the grain of a solid propellant missile during captive flight and free flight conditions.

More specifically, it is an object of this invention to provide a method and means to cool a solid propellant grain during captive flight and free flight conditions by providing a series of helically wound tubes embedded in the insulation material surrounding the solid propellant grain and to thus cool the grain by flowing a coolant liquid therethrough during captive or free flight conditions.

When extreme aeroheat conditions are encountered with modern jet aircraft, active cooling may be used supplied by the aircraft to cool the solid propellant missiles the aircraft is conveying. Cooling fluid from the aircraft may be pumped to the missile to provide the cooling medium. In order to take advantage of the cooling system inherent in most high performance aircraft, a helically wound tube is embedded within the insulation bladder surrounding the solid propellant grain, the bladder being inserted between the solid propellant grain and the outer case. In order to be most effective, the cooling coil should be as close to the critical propellant-to-liner bond as possible. The solution is to wrap the cooling coils in the liner as it is laid on the insulation bladder. The cooled fluid flows into the helical pipe surrounding the motor to the aft end of the motor and returns, thereby keeping the average temperature of the fluid near constant all along the length of the motor.

The cooling fluid is to be selected so that during free flight the evaporation of the captivated fluid within the cooling pipes will keep the case temperature within acceptable limits so that the missile structural requirements will be maintained. The evaporation of the coolant can be controlled by a relief valve at the fluid inlet or outlet. It is generally known that the heat of the missile increases substantially when it is fired from the aircraft, for example, the temperature of the missile during captive flight may be around 600° F, while the temperature of the free flying missile is in the range of 2,400° F.

In addition, the helically wrapped coolant tubing surrounding the solid propellant grain may serve as the release part of a stress relieving liner.

Accordingly, an advantage over the prior art is the elimination of heavy, cumbersome solid propellant liners to prevent overheating of the solid propellant grains.

Another advantage over the prior art is the relative simplicity of the helical wrap of tubing in the insulating layer of the missile.

Still another advantage is the ability of the coolant fluid to continue cooling the solid propellant grain during free flight in that the cooling fluid may be evaporated slowly, controlled by a dump type of valve so that the coolant fluid continually maintains a safe condition of the missile as it is moving through free flight phase of its operation.

The above noted objects and advantages of the present invention will be more fully understood upon a study of the following detailed description in conjunction with the detailed drawings.

DETAILED DESCRIPTION OF THE INVENTION

Figure 1:
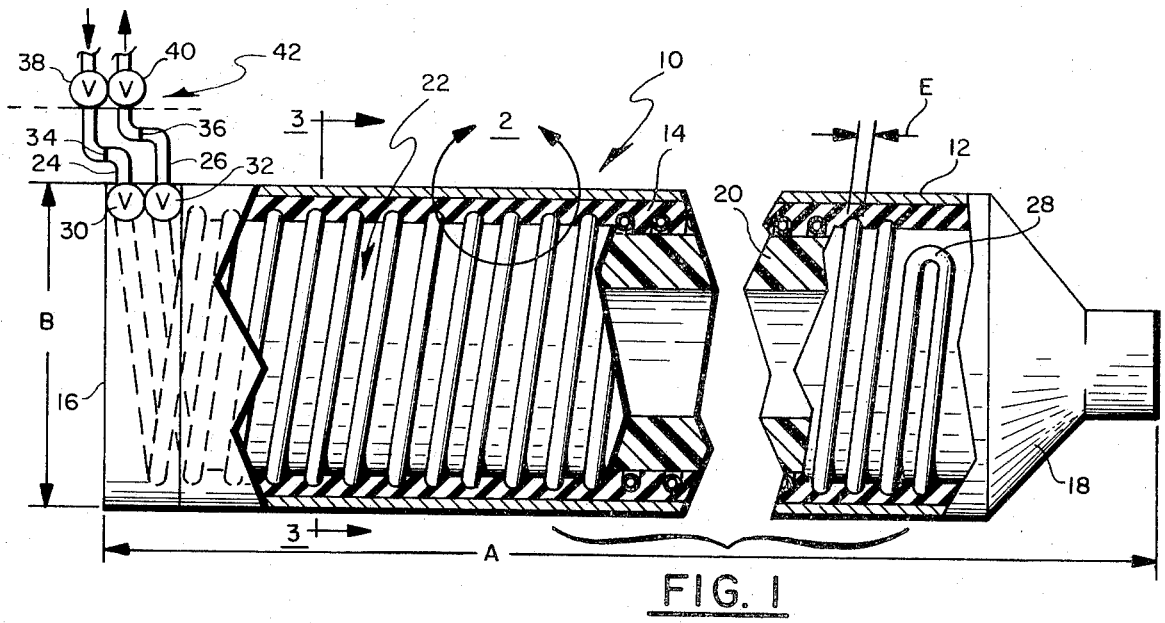
FIG. 1 is a cross-sectional view, partially cutaway, of a typical solid propellant missile having a helically wound tubing surrounding the solid propellant grain embedded in the liner between the solid propellant grain and the missile case.

Referring now to FIG. 1, a solid propellant motor, generally designated as 10, is comprised of a propellant case 12, forward end 16, and at the opposite end, a nozzle 18. Between the propellant case 12 and the solid propellant grain 20 is a liner 14. A conduit generally designated as 22 is helically wound around the outer periphery of the solid propellant grain 20 along the entire length of the motor 10. The helically wound conduit 22 is comprised of an inlet tube 24 that is helically wound around the solid propellant grain from end 16 to the opposite end adjacent nozzle 18. The inlet portion of tube or conduit 24 terminates at end 28, the outlet portion of the coil continuing along an adjacent helical return path in parallelism to the inlet coils back to and through outlet tube 26. The outlet tube 26 terminates adjacent the inlet tube 24 at the forward end of the missile 16. The conduit 22 may be disposed about motor 10 in other configurations. For example, the conduit may be placed on the periphery of the motor longitudinally fore and aft so that the coolant traverses the length of the motor, reverses and comes back along a parallel path (not shown). The flow path is repeated around the motor and returned to an outlet after the coolant has cooled the entire periphery of the motor 10.

The liner 14 is fabricated from, for example, a rubber material. During the missile fabrication process, the rubber material is applied around the solid propellant grain 20, followed by the helical wrap of the conduit 22, subsequently followed by an additional wrap of the rubber liner material 14, thus completing the composite liner made of the rubber material and the embedded coil 22.

A typical example of a missile motor would be approximately 18 inches in diameter (dimension B) and 120 inches long (dimension A). The conduit 22 may be, for example, aluminum, rubber, or plastic and is typically 1/8 O.D. tubing which is wrapped on 1/4 inch centers about the peripheral surface of the solid propellant grain 20. Thus, it can be seen that there would be typically 1/8 inch gaps between the coils of the tubing 22.

Figure 2:
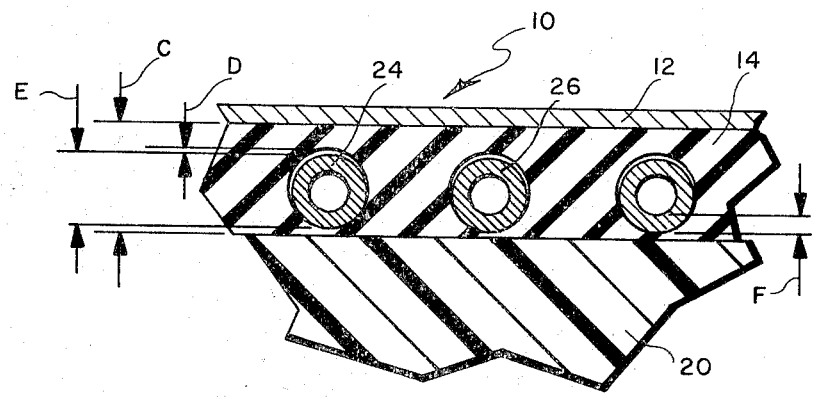
FIG. 2 is a cutaway portion in enlarged cross section of the solid propellant grain showing the coils surrounding the grain and the rubber liner interspersed between the coils and the outer missile shell.

Turning now to the fragmentary view of FIG. 2, the tubing thickness is typically 1/8 O.D. (dimension F) and the thickness of the rubber material 14 (dimension C) is typically 0.03 inch. The rubber liner material may be an elastomeric liner based on carboxy-terminated polybutadiene and imine curative, or elastomers derived from EPT (ethylene-propylene-terpolymers) and cured with organic peroxides. The solid propellant grain may be, for example, comprised of an oxidizer such as ammonium nitrate or perchlorate; a fuel such as powdered aluminum, with suitable binders such as hydroxy-terminated polybutadiene or carboxy-terminated polybutadiene, and curing additives known in the art. The coolant medium could be glycol or a water-glycol mixture, or it may be Freon, whichever is readily available in the aircraft system. The aforementioned coolant fluids exhibit properties which will adequately cool the missile during captive flights which reach a temperature of approximately 600° F and also serve to cool the missile during free flight, wherein the temperature approaches 2,400° F. Typically, water-glycol mixture has a boiling point or vaporization point between 212° F and 380° F, and Freon has a boiling or vaporization point of 80° F at 100 psia.

Referring again to FIG. 2, it can be seen that the rubber liner material can be separated along the upper surface, thus leaving a gap "D" which gives a stress relieving capability to the liner/helical tube combination. The tube does not adhere to the rubber liner 14, thus, the separation between the tube and the liner serves a stress relieving function to accommodate for thermal expansion or contraction of the solid propellant grain 20. Plastic tubing may be used that will not adhere to the liner material. The tube can also be made from a material that sticks to the liner and then the composite is a conventional liner.

Figure 3:
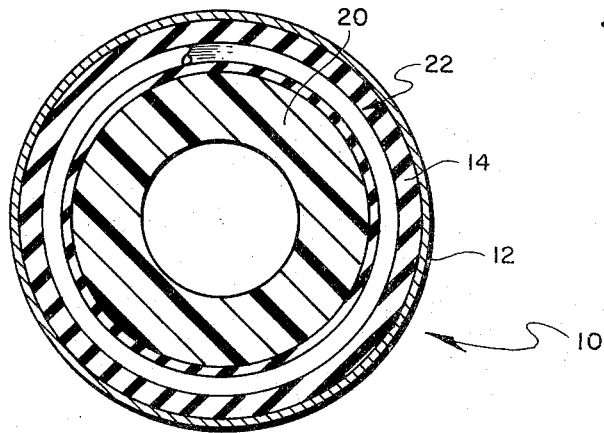
FIG. 3 is a cross-sectional view taken along lines 3—3 of FIG. 1.

Turning now to FIG. 3, the cross section indicates the relationship of the motor 10 with the outside case 12 encompassing the rubber liner 14, having the helically wound conduit 22 disposed within the liner 14. The liner surrounds the solid propellant grain 20.

Referring again to FIG. 1, a system of valves and quick disconnects are necessary to assure reliable cooling of the missile both during captive and free flight. Coolant fluid enters conduit tube 24 through valve 38 in aircraft 42. The coolant fluid circulates through the spirally wrapped conduits 22 and returns to aircraft 42 through the tube 26 via valves 32 and 40. A pair of quick disconnect couplings 34 and 36 provide a means to disengage missile 10 from aircraft 42. Upon disengagement of the missile from the aircraft, valves 38 and 40 automatically close, thus preserving the integrity of the pneumatic system of the aircraft.

Valves 30 and 32 serve to control the release of the fluid encapsulated within the helically wound conduit 22 when the missile leaves the aircraft. Hence, when the missile reaches a high velocity during free flight, as heretofore mentioned, and the recovery air ultimately reaches a temperature of approximately 2,400° F, the liquid entrapped within the conduit 22 vaporizes or boils and is released in a controlled manner through the relief valves 30 and 32, thus continually cooling the solid propellant grain as it expends itself through nozzle 18 and also keeping the case temperature to a reasonably low level to maintain strength throughout the missile flight.

Obviously, when fluids having a higher vaporization point are used, the valves 30 and 32 may not be necessary. The type of cooling fluid utilized and the length and duration of the free flight of the missile all must be taken into consideration when designing the parametric limits of the cooling device.

I claim:

1. A device for cooling the solid propellant grain of a missile carried aloft by an aircraft during captive and free flight comprising:
   a solid propellant grain,
   a liner disposed about the length of said solid propellant grain between said grain and a missile case,
   a spirally wrapped conduit means disposed in said liner along its entire length,
   a source of cooling fluid from said aircraft, said cooling fluid being directed through said conduit to cool said solid propellant grain, and
   quick disconnect means in said conduit between said aircraft and said missile to assure release of said missile from said aircraft.

2. The invention as set forth in claim 1 further including vent valve means connected to said conduit to control the emission of evaporating cooling fluid from said conduit means when said missile is in free flight.

3. A device for cooling the solid propellant grain of a missile motor in captive and free flight comprising:
- a liner disposed between said solid propellant grain and a motor case,
- at least one conduit means disposed within said liner, said conduit means having an inlet and an outlet therein, and
- a source of cooling fluid directed through said conduit to cool said solid propellant grain.

4. The invention as set forth in claim 3 wherein said conduit means disposed in said liner is spirally wrapped about the periphery of the propellant grain and extends from adjacent a first end thereof to the other end, said conduit having a return path within said liner returning to said first end, and valve means attached to said conduit means and said source to control coolant flow.

5. The invention as set forth in claim 4 wherein said valve means entraps said coolant within said conduit means during free flight of said missile.

* * * * *